United States Patent [19]

Dea et al.

[11] Patent Number: 5,742,833
[45] Date of Patent: Apr. 21, 1998

[54] PROGRAMMABLE POWER MANAGEMENT SYSTEM AND METHOD FOR NETWORK COMPUTER STATIONS

[75] Inventors: Frank Dea; Son Hung Lam; Spencer Shepler; Gary Yuh Tsao, all of Austin, Tex.

[73] Assignee: International Business Machines Corporation, Armonk, N.Y.

[21] Appl. No.: 565,375

[22] Filed: Nov. 30, 1995

[51] Int. Cl.$^6$ .................... G06F 1/00; G06F 1/18
[52] U.S. Cl. .................... 395/750.05; 395/750.03; 395/200.54; 395/200.57; 395/200.8; 395/750.01; 340/825.02; 340/825.16; 370/85.3; 370/85.8; 370/445
[58] Field of Search .................... 395/750, 700, 395/200.11, 200.17, 200.21, 800, 733, 750.03, 750.06, 750.05; 340/825.02, 825.03, 825.04, 825.08, 825.16; 370/60, 61, 85.1, 85.2, 85.4, 85.8

[56] References Cited

U.S. PATENT DOCUMENTS

| | | |
|---|---|---|
| 5,379,289 | 1/1995 | DeSouza et al. |
| 5,400,331 | 3/1995 | Lucak et al. ............ 370/85.1 |
| 5,404,544 | 4/1995 | Crayford ............ 395/750 |
| 5,566,339 | 10/1996 | Perholtz et al. ............ 395/750 |
| 5,594,426 | 1/1997 | Ushijima et al. ............ 340/825.02 |
| 5,596,723 | 1/1997 | Romohr ............ 395/200.16 |
| 5,598,566 | 1/1997 | Pascucci et al. ............ 395/750 |

FOREIGN PATENT DOCUMENTS

| | | |
|---|---|---|
| 0 568 386 A2 | 11/1983 | European Pat. Off. . |
| 0 558 234 A1 | 9/1993 | European Pat. Off. . |
| 0 573 204 A2 | 12/1993 | European Pat. Off. . |

*Primary Examiner*—Ayaz R. Sheikh
*Assistant Examiner*—Raymond N. Phan
*Attorney, Agent, or Firm*—Robert M. Carwell

[57] ABSTRACT

A frame-address matching function of a network controller is enhanced. In a full power-on mode, the controller performs conventional functions. In the low-power mode, the controller includes frame-address and frame-data matching, as well as pre-determined and programmable autonomous response to network protocol. If a match occurs with respect to the frame destination address or frame data, the system associated with the controller is placed in a wake-up state. If the controller is programmed to perform pattern matching inside the frame data area, upon such match in the frame data area the controller will generate and transmit on the network a simple response packet automatically. Conversely, if a match is not detected, no action is taken. The frame-data patterns are programmable with the capability to mask out certain data fields as desired which are protocol dependent and are substantially protocol dependent.

3 Claims, 4 Drawing Sheets

| PREAMBLE | DESTINATION ADDRESS | SOURCE ADDRESS | FRAME TYPE | FRAME DATA | CRC |
|---|---|---|---|---|---|
| 64 BITS | 48 BITS | 48 BITS | 16 BITS | 368-12000 BITS | 32 BITS |

ETHERNET FRAME FORMAT

FRAME DATA          RESPONSE BUFFER

PROGRAMMABLE POWER MANAGEMENT SYSTEM AND METHOD FOR NETWORK COMPUTER STATIONS

TECHNICAL FIELD

This invention relates to efficient power management of computers and, more particularly, relates to systems and methods for reducing power consumption of computers in computer networks.

BACKGROUND OF THE INVENTION

Modern day concerns in preserving the environment and providing for more efficient energy consumption, have resulted in new design techniques seeking to incorporate energy saving features in new products. The computer industry itself has felt this emerging need for more energy-efficient computer systems, an example of which is computers which are designed go into a low-power standby or hibernation state whenever possible in order conserve energy.

One application of such PCs or workstations capable of toggling between and active and low-power states is in computer networks. Theoretically, PCs or workstations (hereinafter "stations" generically for convenience) may be interconnected on a network and selectively activated as required into a normal powered-up state as required by messages on the network. However, in practice it has been found to be very difficult indeed to maintain such a station in a dormant low-power state of standby or hibernation while it is connected to a network such as an Ethernet network awaiting such a message to be activated. The reason for this is due to the nature of network transmissions which take the form of broadcast packets. Particular forms of such broadcast packets are typically found in network environments which unfortunately often "wake up" or activate the station unnecessarily. A representative example of such broadcast packets is the IPX-SAP packet which occurs so frequently, e.g., once per minute, that stations are, as a practical matter, not capable of any meaningful standby or hibernation state due to the frequency of such broadcast packets activating the stations often unnecessarily with irrelevant information.

One approach to this problem is to provide for a filtering out of all such broadcast packets by the stations' network controllers. While this may appear to address the problem of unnecessary activation of stations, a serious downside to such an approach is that many existing protocols will cease to run on the network or, equally as serious, connections may simply be lost. Accordingly, it is commonplace in modern PC and workstation networking technology to simply provide for such stations to always be in a full power-on state.

This of course is contrary to the aforementioned modern trend of energy conservation policy such as that embodied in the Environmental Protection Agency's EnergyStar guidelines which encourage the concept of energy conservation and low-power states whenever possible to be used in technology. Unfortunately, such guidelines further strongly recommend that, with respect to network connections, such connections preferably not be lost while the station is in the low-power state. This obviously gives rise to mutually inconsistent design criteria of saving power by low-power state designs in network stations while at the same time avoiding loss of connections, the very cause of which is or may be such toggling to low-power states.

Turning to a specific network protocol in order to illustrate the problem, in a typical such protocol such as the TCP/IP protocol, dynamic binding between network IP addresses and physical addresses (e.g., IEEE Ethernet 48 bit addresses, for example,) is effected by use of an Address Resolution Protocol (ARP) broadcast mechanism. More particularly, in operation, when it is desirable for a host "A" for example, to resolve an IP address "I-b", the host, in accordance with the protocol, will broadcast a special packet requesting the host with the IP address "I-b" to respond with its corresponding physical address, namely "P-b". All of the hosts on the network, including "b", will receive such requests, but only host "b" recognizes its IP address "I-b" in the broadcast, and accordingly only host "b" will respond by sending a reply containing its physical address.

When A receives such reply, it may then use the physical address thereby received in order to send an Internet packet as desired (e.g., mail, etc.) directly to station B. In most cases, then, an ARP broadcast packet is thereby sent before a host can send a dedicated packet to another host for mail or other such applications. Ideally, if station B is in a low-power mode, in accordance with the foregoing desired goal of energy saving, it would desirably be "woken up" or activated only if the broadcast packet on the network is in fact intended for, and of interest to the B station with such B station ignoring any such broadcast packets by remaining in the low-power and thus low-energy consuming mode.

Unfortunately, however, in practice most controller chips such as those associated with the Ethernet protocol may only perform frame physical destination address matching, i.e., simply comparing the destination address field of an incoming frame with some pre-defined addresses. More particularly, such controllers do not have the capability to perform pattern matching inside the frame data area. However, without the capability of analyzing data in the frame-data area, the objective of saving energy in network systems while at the same time retaining the integrity of the network cannot be achieved simply by enabling or disabling broadcast addresses in an effort to solve the problem. This is because, stated differently, the data frame portion of a frame is the portion which provides information as to whether a particular station should accept or reject a particular broadcast packet, e.g., whether in response to a given broadcast packet, a system board and associated CPU should be activated or, on the contrary, should remain in a low-power state because the data associated with the broadcast packet is not relevant to the particular station.

Yet another example illustrating the problem in the real world may be seen in the case of yet another protocol, namely the IPX protocol associated with the network, and more particularly, the service advertisement protocol (SAP) mechanism operating above the IPX protocol. SAP broadcast packets (e.g., server broadcasts indicating service which is available on the network) are, in this implementation, transmitted by the server once per minute. If a client host is in a low-power mode and must respond to such a broadcast packet, it should be readily apparent that there is no chance that the client can ever in any significant or meaningful way remain in a low-power mode in order to effect the desired energy conservation goals. However, if in order to effect such goals, the client host remains in the low-power mode and is thus not responding to such SAP broadcast packets, the client obviously may miss some important information such as the fact that a server has been shut down. Ideally, then, such an Ethernet controller mechanisms were needed which could conditionally wake up stations from only a selected subset of SAP packets.

Yet a further problem associated with maintaining low-power states of stations in a network environment is that some network protocols may require a client to respond to "heart-beat" types of queries (e.g., establishing whether a particular client is still "alive", e.g., functioning properly). Accordingly, compounding the already difficult situation hereinbefore set forth, it was necessary that a solution to the aforementioned problem further include capability that the network controller in the client (such as the aforementioned Ethernet controller) in a low-power mode, could autonomously respond to such heart-beat types of queries without having to wake the client CPU system up.

SUMMARY OF THE INVENTION

It is accordingly an object of the invention to provide for improved energy saving features in a network environment.

It is yet another object of the invention to provide an inexpensive hardware solution to the problem of energy management in networked computer stations while at the same time avoiding loss of connections and stations missing important data.

It is yet a further feature of the invention to provide for energy saving peer-to-peer station communication in a computer network environment which is transparent to network software and servers and thus not reliant thereupon.

It is a further feature of the invention to provide programmable power management systems and methods implemented in a network interface controller for networked computer stations which may easily and inexpensively alter, enable and disable system power-ons with respect to selected packets.

It is yet another feature of the invention to provide for response in a computer network to proprietary heartbeat queries without the necessity of waking up the station.

It is still a further feature of the invention to provide a programmable network interface which permits filtering in response to network packets to provide interaction with a power-saving workstation or computer on a network.

It is still a further feature of the invention to provide a programmable network interface controller for use in a computer network which responds to power-on/off sequences obviating the necessity to alter application or control software.

In a preferred embodiment of the invention, a frame-address matching function of a network controller is enhanced. In a full power-on mode, the controller performs its conventional functions. In accordance with the invention, however, in the low-power mode, the controller includes the capability of frame-address and frame-data matching, as well as pre-determined and programmable autonomous response to network protocol.

More particularly, in a preferred embodiment, the controller, such as an Ethernet controller, provides up to 16 frame-address and data matching. If a match occurs with respect to the frame destination address or frame data, the system associated with the controller will be placed in a wake-up state. If the controller has been programmed to perform the aforementioned pattern matching inside the frame data area, upon such a match in the frame data area, the controller will be caused to generate and transmit on the network a simple response packet automatically. Conversely, if a match is not detected, no action is taken. The frame-address may be any valid address such as a broadcast, multicast, or fixed IEEE address. The frame-data patterns are programmable with the capability to mask out certain data fields as desired and are substantially protocol dependent.

In an alternative embodiment, a microcontroller is included with the network controller to perform the above low-power mode functions, with the network controller, such as the Ethernet controller, providing a simple interface to such low-cost controller (which, in one embodiment may take the form of a well-known 8051 embedded microcontroller). In accordance with this embodiment, the Ethernet or like-controller thereby is slaved to the microcontroller in the low-power mode. In full-on mode, the microcontroller is disabled. Performance requirements for the microcontroller are minimized or avoided because most broadcast packets are less than 64 bytes and may thereby easily fit into the internal FIFO buffer of the Ethernet or like-controller.

In accordance with the foregoing capability, a workstation or PC is thereby programmed to enter a wake-up mode on specific broadcast packets or, alternatively, may be caused to autonomously respond to a broadcast packet with a simple pre-determined packet. In a hibernation mode, in like manner, the station is thereby programmed to be woken up only by a unique address and data frame pattern which may depend upon future standards promulgated as desired. Accordingly, the station will be woken up only when it is appropriate to do so, with the Ethernet controller handling the simple response of broadcast packets without unnecessarily placing the station in a wake-up mode but all the while maintaining the network connection as is desirable.

DETAILED DESCRIPTION OF THE PREFERRED EMBODIMENT

A representative and more detailed discussion of the general principles associated with network technology such as the Ethernet technology discussed herein may be obtained from reference to "INTERNETWORKING WITH TCP/IP, Vol. 1, PRINCIPLES, PROTOCOLS AND ARCHITECTURE", D. E. Comer, Prentice-Hall Publishing Co., 1991, and in particular, to Section 2.4 of such reference, which is incorporated herein by reference.

Figure 1:
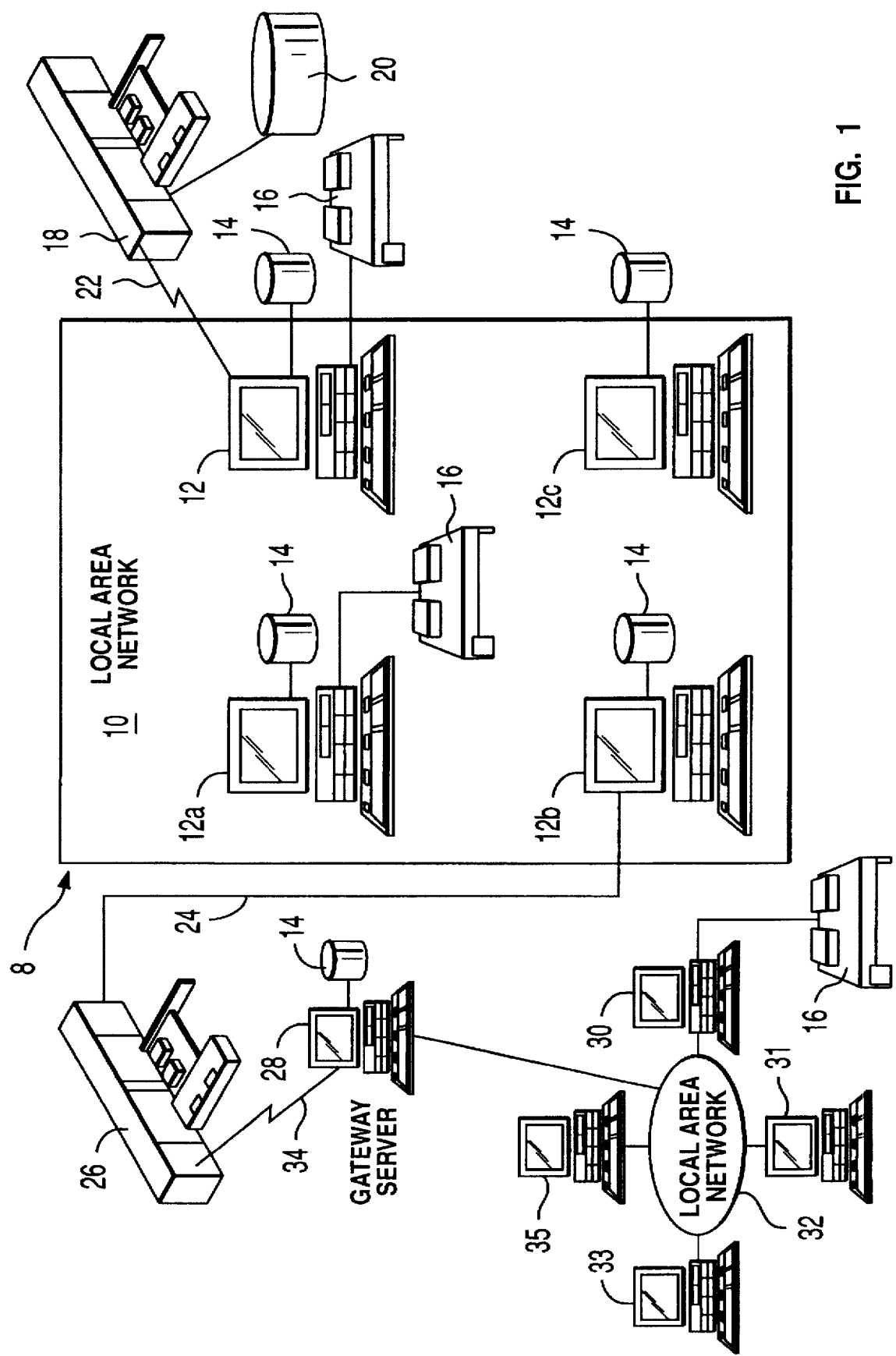
FIG. 1 is block diagram of a computer network in which the power management invention for networking stations may be implemented.

Turning first to FIG. 1, a high level description of a network environment will first be provided in which the invention preferably may be embodied. With reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer workstation, both product of International Business Machines corporation, located in Armonk, N.Y. "RISC SYSTEM/6000" is a trademark of International Business Machines Corporation. "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

A preferred embodiment of the present invention may be incorporated within various computers depicted within data processing system 8

Figure 2:
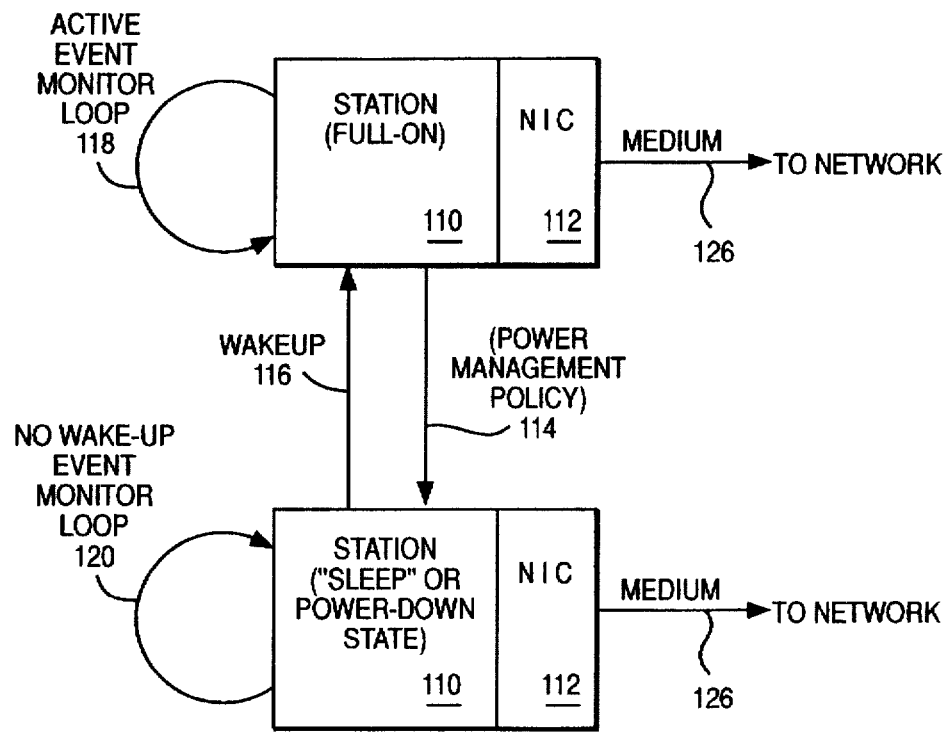
FIG. 2 is a functional block diagram illustrating the toggling of a station operating in the network of FIG. 1 and including a network interface controller between a full-on and power-down state.

Turning now to FIG. 2, the figure illustrates the mechanism whereby a station may be toggled between power-down (sleep) mode and a full-on state as a result of its interconnection on a network. In the upper portion of the diagram, a network interface controller 112, taking the form of an adapter card or being built into the motherboard of the station, is interconnected and integrated with the station 110 which may be a personal computer, workstation, terminal, or the like. The function of such an NIC 112 generally is to provide the interface logic between the network and network connection 126 and the actual station 110, thereby facilitating the station being able to communicate with other devices on the same network such as Token Ring, Ethernet, ATM, FDDI, etc. In conventional operation, when the NIC 112 receives an appropriate signal on the network medium 126, it causes interruption of the processes executing on the station in software, whereupon such software operating in the station processes the packet. As shown by the upper portion of FIG. 2, when the station is in a "full-on" mode, a process is looping shown by the loop 118, monitoring for an active event, e.g., activity of the system such as I/O from an appropriate pointing device such as a mouse, keyboard activity, or the like. This loop essentially implements a predetermined power management policy such that in absence of a predetermined active event sensed for by the loop 118, the station will toggle into a sleep or power-down state shown in the lower portion of FIG. 2. This transition is shown by the power management policy arrow 114, such policy being defined by the operating system under which the station is operating.

After absence of an active event is sensed, the station 110 enters the power-down state and feedback loop or process 120. However, in this instance, the loop is sensing for occurrence of a wake-up event such as a keyboard stroke or other active event which otherwise would have kept the station in the full-on mode after being sensed in loop 118. Upon detection of such a wake-up event in the loop 120, the station 110 will then exit the power-down state as shown by the wake-up arrow 116, whereupon it will once again enter the full-on state.

Figure 3:
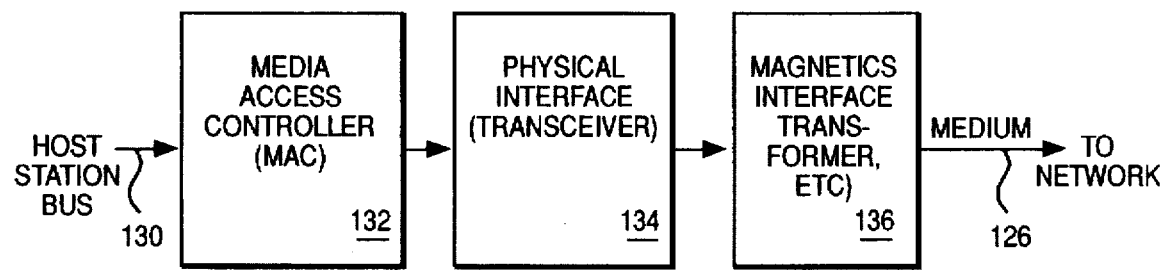
FIG. 3 is a functional block diagram of a representative network interface controller of FIG. 2.

Turning now to FIG. 3, a more detailed description of the NIC 112 of FIG. 2 is provided. Such an NIC is conventionally comprised of three basic functional components, namely a media access controller (MAC) 132, a physical interface or transceiver 134, and an appropriate interface generally taking the form of some magnetics components 136.

Concerning the MAC 132 controller first, in a conventional form it essentially represents and encapsulates the lowest level of network protocol prior to the physical medium or layer, and is dependent upon the particular networking technology being employed. In other words, in the embodiment under discussion wherein an Ethernet network is provided, a specific MAC protocol associated with the Ethernet is predefined which will be implemented by the MAC controller 132. It will be seen from the figure that the MAC controller 132 interfaces to the host bus 130 of the particular station in which it is installed.

Next, a physical interface or transceiver 134 is provided which essentially translates levels between the digital domain which the host bus 130 and MAC controller 132 operate in and the analog domain which the magnetics 136 and network medium 126 operate in.

Finally, in terms of function, the magnetics block 136 is intended to indicate the function of providing the appropriate impedance matching and interfacing between the transceiver 134 and the network medium 126, whether it be Ethernet, FDDI, etc. More will be hereinafter described relative to the modified functions of the MAC 132 in accordance with the invention hereinafter.

Figure 4:
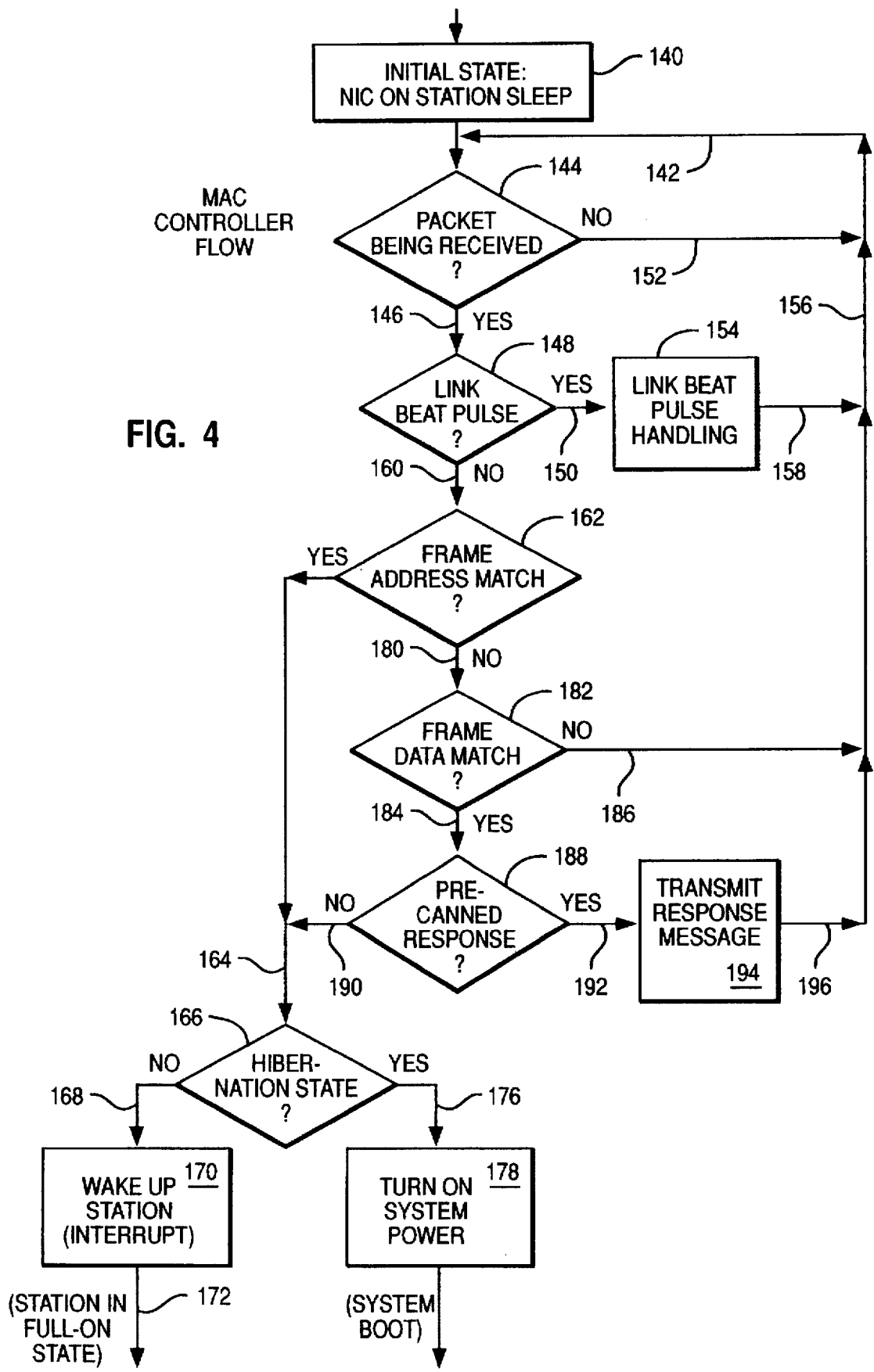
FIG. 4 is a flow diagram of software of a MAC controller portion of the NIC of FIG. 3 implementing the subject invention.

Turning now to FIG. 4, a diagram is depicted therein of the MAC controller 132 flow which will implement the invention. In the initial condition or state shown at 140, it will be assumed that a given station implementing the invention in the network is in a low-power or power-saving state as dictated by the power management policy hereinbefore discussed, namely the station will be in the state shown in the lower portion of FIG. 2. It will be noted that it is a feature of the invention that the NIC 112 associated with the station, notwithstanding this power-down state of the station itself, will be continually in a powered-up mode although, in accordance with conventional practice and good design, the well known transmit circuitry associated with the NIC may be powered off as appropriate, anticipating events to be detected wherein power-up of the transmitter circuitry will be required.

Continuing with FIG. 4, the MAC controller in the NIC 112, as shown at block 144, will be capable of monitoring the medium 126 of the network to detect whether a packet is being received by the NIC on the medium 126, shown at block 144. So long as the NIC is determining that a packet is not being received, it will remain in the loop monitoring for a packet as shown by arrows 152, 142. It is important to recall at this point that it is an important feature of the invention that the station per se at this point remains in a power-down state, thereby achieving the energy efficiency goal of the invention while nevertheless at the same time, the station is still essentially remaining an active component in the network. This is so inasmuch as the NIC 112 is performing the function of monitoring network activity for information contained in a packet which is of interest to the particular station.

Once the NIC determines that a packet has been received, 146, the MAC controller code will then determine at block 148 whether it is a link beat pulse. Link beat pulses are related to the particular media in which the network is operating, such as Ethernet, Token Ring or the like, each of which have their own definition of how a link beat mechanism is to work. In essence, the purpose of the link beat is to enable the network to periodically poll the stations on the network to sense for a heartbeat, e.g., whether generally the various stations are on the network and remain operative. If, in response to this detection that a periods link beat pulse has in fact been received in the packet, the process exits 150, whereupon the NIC performs appropriate link beat pulse handling 154, appropriate to the specific media. After effecting such handling, the process will exit at 158, and proceed through path 156, 142 back to the monitoring state in which the NIC is again in a loop monitoring for receipt of a packet at 144.

In passing, it will be noted that it may be desirable for a station not relying on a particular physical medium protocol to provide information developed by itself and its own protocol to perform such a heartbeat mechanism check. In this situation, the solution provided by the invention may be provided to respond automatically to heartbeat inquiries so as to not require waking up of the entire workstation or PC.

Continuing with FIG. 4, if it is determined that a packet has been received, but it is not merely a link beat pulse, shown by exiting path 160 from block 148, next the MAC controller flow examines the packet to determine if there is a frame address match, 162.

Figures 5, 6:
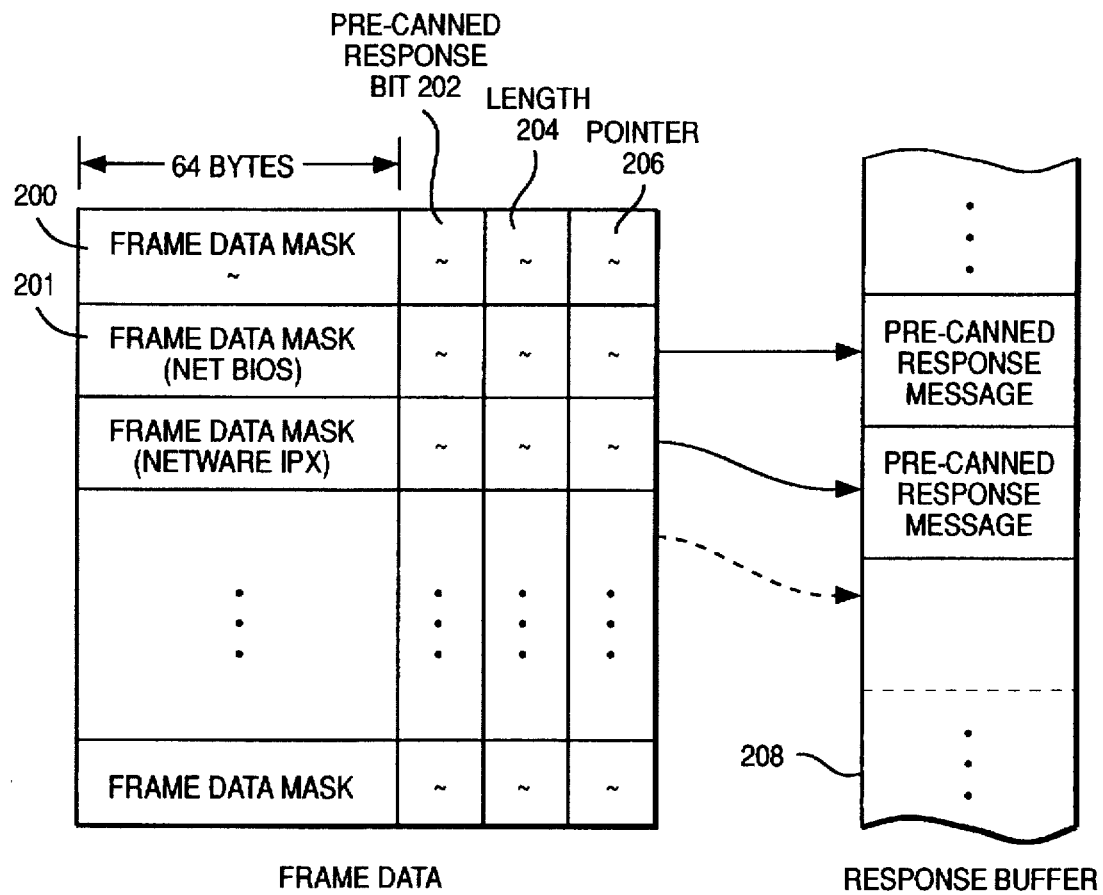
FIG. 5 is a schematic illustration of the format of a typical representative frame or packet on a network, including a frame data portion utilized for pattern matching in accordance with the invention.
FIG. 6 is a schematic illustration of frame data and pre-determined responses in accordance with the invention.

Turning briefly to FIG. 5, this figure illustrates a typical format of a frame or packet in a network, in this case as it travels across an Ethernet network. Detailed discussion of this representative format may be found at page 26-27 of the aforementioned Section 2.4 of the previously cited reference. It will be noted that one field in this frame, which is typical of various network protocols, is in this case referred to as a "destination address". It is conventional for each set of hardware or more properly each station in the network to have a uniquely defined such destination address. As shown as block 162 of FIG. 4, the MAC controller flow at this point will perform a comparison to determine whether this frame address represented by the destination address in the packet matches the unique address of the station. If so, the process exits along path 164, thereby having determined that because of detection of this frame address match, clearly it is desirable that the packet being received is intended to interact with this particular station.

At this point, the system will therefore, in response to this signal on path 164, determine if the corresponding station is in a hibernation state, shown at block 166. If not, shown by exiting along path 168, the system must simply be woken up, shown at block 170 by means of an appropriate interrupt, whereby the system may be brought into a full-on state, shown at arrow 172. Alternatively, if at block 166 it is determined that in fact the station is in a full hibernation state, the process will exit at path 176, whereupon the system power will be turned on and a full system boot executed at 178. The distinction between the two states, 170 and 178 is that in state 170, the CPU may nevertheless have low-power applied to it, in which case the system may be woken up simply by means of an interrupt as opposed to a full system boot shown in the block 178 in which case full system power must be applied as well. It will further be noted in passing that in such a hibernation state, substantial energy savings may be realized inasmuch as typically in such a state a power consumption on the order of two watts nominally may be experienced, attributable to the NIC 112 remaining on.

In prior art it will be noted that some forms of "wake-ups" may be provided, such as in the case of more than ring wake-up in a dedicated PC. However, the important distinction is that in such a case the modem is not present in a network wherein the system in which it is installed is required to be handling network wake-up commands. Thus, previously, it was necessary for stations to be up all the time in order to do any status checking whereas in accordance with the invention, it permits the system to shut down completely in the network or hibernate and be woken up while nevertheless still providing the ability to enable a server to check status of the station. This is so inasmuch as the NIC, with the modified MAC controller flow herein described, may provides the function of responding to packets and monitoring them with the lower power consumption associated with the NIC itself being the only component powered up all the time.

Turning now to FIGS. 5 and 6 in more detail, they will be discussed in greater detail with reference to the novel frame data matching function 182 and predetermined response function 188, shown in FIG. 4. As shown in FIG. 4, if the MAC controller flow determines that a frame address match 162 is not present, shown at path 180, next the program implemented in the MAC of the NIC, determines whether there is a frame data match, 182. Referring to FIG. 5, it will be noted that a frame data field is provided in network packets typically of varying sizes which, in turn, provide the facility of permitting implementation of differing frame data masks such as those represented at reference numerals 200, 201 of FIG. 6. In the implementation presently being described, this facility enables a check shown at block 182 which examines, for example, the first 64 bytes of the frame data field for a match to predetermined data stored in the MAC which uniquely identifies the station associated with the MAC.

It is important to note that in modern day networking technology, a given station may support concurrently multiple protocols, and thus this frame data field enables different frame data masks associated with each such supported protocol to be stored. More specifically, with respect to the TCP/IP protocol, there may for example be no predetermined response defined or required. However, in the case of a Netbios protocol, one particular form of predetermined response may be required. It will be understood that such a predetermined response is essentially a unique message from a specific station in a particular protocol utilized to advise a particular server that the station is operating and functional.

Continuing with the example, yet another protocol such as that of Netware may require yet an additional and different predetermined response to a packet being sent in accordance with the Netware protocols. More particularly, as previously described with respect to the IPX protocol of Netware, as previously described, SAP broadcast packets may be sent by the server once per minute whereby the server is polling the stations on the network to determine their operability. Thus it will be readily appreciated that a given station must provide a pre-determined response to such a polling which is uniquely designed to be consistent with this particular protocol. Also as previously described, if the client host is in a low-power mode and thus not responding to the SAP broadcast packets, the client station may miss some important information. As shown by the block 188, predetermined responses may be found from the frame data matching function shown at block 182 (as represented by the flow along path 184 to block 188). After a lookup table function determines that such a pre-defined response is in fact stored in the frame data predetermined response information of FIG. 6, the system will exit path 192 to cause transmission of the appropriate protocol-dependent predetermined response message, whereupon which the process loops back along path 196, 156, 142 to continue monitoring for additional packets, 144. However, it is an important feature that the NIC controller should in fact conditionally wake up the station from some packets such as these SAP packets wherein a predetermined response is not detected. This is shown by exiting the block 188 along path 190, whereupon the system may be woken up as desired.

Continuing with FIG. 4, if it was determined that a frame data match did not occur at block 182, this essentially is saying that the particular station in which this flow is being executed should not be activated as a result of this packet, in which case the process exits at 186, returning back to the loop at block 144 which monitors for receipt of additional packets 144. However, by exiting along path 184 indicating that a frame data match was received, this indicates that probably it will be necessary to wake up the station. However, in accordance with the invention, before doing so, it is an important feature of the invention that one last check will be performed by the block 188, namely to determine if a pre-stored protocol dependent response is available, in which case the process exits at 192 to transmit this pre-stored and protocol-dependent response message.

Turning to FIG. 6 in more detail, this is intended to functionally illustrate the data structures which may be stored in the NIC for effecting this detection of a pre-stored response in accordance with block 188, and for further effecting the appropriate response shown at block 194. The data stored in the NIC for performing this function may be seen to be comprised of multiple fields, including a frame data mask 200, predetermined response bit 202, length and pointer fields 204, 206. It is important to note that each field is programmable as desired. Thus, for example, each frame data mask such as 200 or 201, may selectively mask out certain areas as desired such as protocol messages to which it is not desired for the station to respond or be activated, thereby permitting the selective filtering of messages which will activate the station.

Each of these frame data masks will be associated with a different network protocol such as Netbios, Netware, and so forth. The purpose of the pre-canned response bit field 202 is to indicate which of the frame data masks is to be active. If for example, the response bit as 202 is present with respect to the frame data mask associated with Netware, 201, and more particularly, IPX requests, when the incoming appropriate portion of the frame data field of FIG. 5 is compared to this frame data mask 201, a match thereby indicating that a predetermined response is required, as shown by path 192 of FIG. 4. Next, then, the problem is to determine, solely by the NIC, without having to wake up the station, what the appropriate expected response message should be. This is the purpose of the length and pointer fields 204, 206. The length field 204 indicates the length of an appropriate predetermined response message corresponding to the particular frame data mask such as mask 201. Similarly, the corresponding pointer 206 points to a location in the response buffer 208 in the NIC which contains the specific appropriate response corresponding to the particular frame data mask which is selected by presence of the predetermined response bit 202. For example, if, in doing the frame data matching and predetermined response functions 182, 188, it is determined that the data in the incoming packet in the frame data of FIG. 5 is a Netware IPX message for which a predetermined response is required, block 194 will (after determining this by utilizing the lookup table of FIG. 6), obtain the pointer to the appropriate response in the response buffer 208 and the length of such response, and then create a packet transmitting this appropriate response message as shown by block 196 onto the network.

For the sake of clarity, although with reference to FIG. 4 a station may be assumed to be generically in a "low-power" or "power-saving" state, the invention is not intended to be limited to situations wherein a station is only in one such state. Rather, the invention admits to alternatively being in any of various such low-power or power-saving states, examples of which may be variously known in the art and include, but not by limitation, being in a "sleep", "hibernation", "standby", or "power-saving" state.

Also by way of clarification, with reference to FIGS. 5 and 6, the disclosure herein is not intended to imply that the invention is limited only to cases wherein the entirety of a frame data mask such as that of reference numeral 200 in FIG. 6 must match in its entirety a frame data or portion thereof shown in FIG. 5. Thus, the invention admits to monitoring for a match between any subset of a frame data mask with a corresponding portion of frame data as desired.

While the invention has been shown and described with reference to particular embodiments thereof, it will be understood by those skilled in the art that the foregoing and other changes in form and detail may be made therein without departing from the spirit and scope of the invention.

We claim:

1. A method for power management in a network of computer stations each of said stations including a network interface controller, comprising:

storing in one of said controllers corresponding to one of said stations
at least one programmed protocol dependent pattern within a frame data; and
a corresponding predetermined response message;
said storing including
storing a response buffer of each said predetermined response message, and wherein each said predetermined response message comprises a corresponding message length and message pointer in pair, each said pairs of which identifies a different said predetermined response messages and corresponds to a different frame data mask;
monitoring with said one of said controllers for said frame data on said network;
detecting in said one of said controllers from said monitored frame data whether a match occurs of said stored pattern with a pattern within said monitored frame data;
determining, in response to said detecting of said match, if said corresponding predetermined response message is stored;
transmitting said predetermined response message onto said network in response to said determining that said corresponding predetermined response message is stored;
determining with said controller, in response to determining said predetermined response message is not stored, whether said station is in a hibernation state;
said at least one programmed protocol dependent pattern and corresponding response message comprise a plurality of pairs comprised of a said pattern and a said corresponding response message, each said response message in said pairs corresponding to a different network protocol;
placing one of said stations in a low-power state;
wherein said storing, monitoring, detecting, determining, and transmitting steps are executed by one of said controllers corresponding to said one of said stations while said one of said stations is in said low-power state; and
transmitting said frame data from a different said one of said controllers to said one of said controllers.

2. An apparatus for improved power management in a network of computer stations each of said stations including a network interface controller, comprising:
means for storing in one of said controllers corresponding to one of said stations
at least one programmed protocol dependent pattern within a frame data; and
a corresponding predetermined response message;
said means for storing including
means for storing a response buffer of each said predetermined response message, and wherein each said predetermined response message comprises a corresponding message length and message pointer in pair, each said pairs of which identifies a different said predetermined response messages and corresponds to a different frame data mask;
means for monitoring with said one of said controllers for said frame data on said network;
means for detecting in said one of said controllers from said monitored frame data whether a match occurs of said stored pattern with a pattern within said monitored frame data;
means for determining, in response to said detecting of said match, if said corresponding predetermined response message is stored;
means for transmitting said predetermined response message onto said network in response to said determining that said corresponding predetermined response message is stored;
means for determining with said controller, in response to determining said predetermined response message is not stored, whether said station is in a hibernation state;
wherein said at least one programmed protocol dependent pattern and corresponding response message comprise a plurality of pairs comprised of a said pattern and said corresponding response message; and further wherein each said response message in said pairs corresponds to a different network protocol;
means for placing one of said stations in a low-power state;
wherein said storing, monitoring, detecting, determining, and transmitting are executed by one of said controllers corresponding to said one of said stations while said one of said stations is in said low-power state; and
means for transmitting said frame data from a different said one of said controllers to said one of said controllers.

3. A computer program product for power management in a network of computer stations each of said stations including a network interface controller, comprising:
computer readable program code means for storing in one of said controllers corresponding to one of said stations
at least one programmed pattern within a frame data; and
a corresponding predetermined response message; wherein said computer readable program code means for storing in said one of said controllers includes:
computer readable program code means for storing a response buffer of each said predetermined response message, and wherein each said predetermined message comprises a corresponding message length and message pointer in pair, each said pair of which identifies a different said predetermined response message and corresponds to a different frame data mask;
computer readable program code means for monitoring with said one of said controllers for said frame data on said network;
computer readable program code means for detecting in said one of said controllers from said monitored frame data whether a match occurs of said stored pattern with a pattern within said monitored frame data;
computer readable program means for determining, in response to said detecting of said match, if said corresponding predetermined response message is stored;
computer readable program code means for transmitting said predetermined response message onto said network in response to said determining that said corresponding predetermined response message is stored;
computer readable program code means for determining with said controller, in response to determining said predetermined response message is not stored, whether said station is in a hibernation state; wherein said at least one programmed protocol dependent pattern and corresponding response message comprise a plurality of pairs comprised of a said pattern and said corresponding response message; and further wherein each said response message in said pairs corresponds to a different protocol;

computer readable program code means for placing one of said stations in a low-power state wherein said storing, monitoring, detecting, determining, and transmitting steps are executed by one of said controllers corresponding to said one of said stations while said one of said stations is in said low-power state;

computer readable program code means for transmitting said frame data from a different said one of said controllers to said one of said controllers.

* * * * *